United States Patent
Boittin et al.

(10) Patent No.: US 8,998,240 B2
(45) Date of Patent: Apr. 7, 2015

(54) TRACTOR REAR HITCH

(75) Inventors: Philippe Boittin, Laboissiere en Thelle (FR); Ante Bozic, Compiegne (FR)

(73) Assignee: AGCO SA, Beauvais (FR)

( * ) Notice: Subject to any disclaimer, the term of this patent is extended or adjusted under 35 U.S.C. 154(b) by 0 days.

(21) Appl. No.: 13/997,453

(22) PCT Filed: Dec. 9, 2011

(86) PCT No.: PCT/EP2011/006195
§ 371 (c)(1),
(2), (4) Date: Oct. 16, 2013

(87) PCT Pub. No.: WO2012/084136
PCT Pub. Date: Jun. 28, 2012

(65) Prior Publication Data
US 2014/0027999 A1   Jan. 30, 2014

(30) Foreign Application Priority Data
Dec. 24, 2010   (GB) .................................. 1021941.8

(51) Int. Cl.
*A01B 59/042* (2006.01)
*A01B 59/00* (2006.01)

(52) U.S. Cl.
CPC .............. *A01B 59/042* (2013.01); *A01B 59/002* (2013.01)

(58) Field of Classification Search
CPC ...... B60D 1/143; B60D 1/155; A01B 59/002; A01B 59/042
USPC .......... 172/272, 437, 439, 482, 677; 280/437, 280/482, 495
See application file for complete search history.

(56) References Cited

U.S. PATENT DOCUMENTS

| | | | |
|---|---|---|---|
| 3,795,415 A | 3/1974 | Koch et al. | |
| 4,397,359 A | 8/1983 | Price et al. | |
| 7,104,340 B1 | 9/2006 | Thompson et al. | |
| 2005/0283296 A1 | 12/2005 | Viaud | |
| 2006/0070757 A1* | 4/2006 | Posselius et al. | 172/677 |

FOREIGN PATENT DOCUMENTS

| | | |
|---|---|---|
| EP | 1645176 A1 | 4/2006 |
| GB | 2244906 A | 12/1991 |
| SU | 852205 A1 | 8/1981 |
| WO | WO-91/02226 A1 | 2/1991 |

OTHER PUBLICATIONS

International Search Report for International Application No. PCT/EP2011/006195 Dated May 8, 2012.
GB Search Report for GB Application No. 1021941.8 Dated Apr. 18, 2011.

* cited by examiner

*Primary Examiner* — Joseph Rocca
*Assistant Examiner* — Felicia L Brittman

(57) ABSTRACT

A rear hitch assembly (10) for an agricultural tractor is provided. The assembly comprises a drawbar carrier element (20) mounted to the underside of a chassis (13) by a first connection which permits fore and aft movement of the carrier element relative to the chassis. A second connection includes a load sensor (30) which senses horizontal load placed upon the carrier element. Implement connector elements such as drawbars (22) and connector plates (15) are attached to the carrier in a fixed positional relationship. The horizontal load is isolated from the vertical load and measured by the load sensor to provide load information which can be utilised by brake systems for example.

6 Claims, 7 Drawing Sheets

TRACTOR REAR HITCH

CROSS-REFERENCE TO RELATED APPLICATION

The present application claims the benefit of and priority from United Kingdom Application No. 1021941.8, filed Dec. 24, 2010, the entire disclosure of which is hereby incorporated by reference.

FIELD OF THE INVENTION

The invention relates to rear hitch assemblies for agricultural tractors which include means to measure external loads placed upon the hitch by attached implements and trailers.

BACKGROUND

The rear hitch of an agricultural tractor is arranged to engage with various attachment mechanisms associated with implements and trailers. There are two main mechanisms by which an implement can be attached to a tractor. Some implements are mounted to a three-point linkage wherein the tractor rear hitch includes a pair of lower lift arms and a top link which all attach to the implement forming a triangulation structure. This allows implements such as ploughs, hay tedders and hedge cutters to be lifted from the ground by appropriate control of the lower linkage arms thus transferring all weight from the implement to the tractor.

Other implements such as trailers, rollers and balers are attached to a drawbar for hauling. This group of implements either comprises its own axle (trailers and balers) or is required to transfer weight to the ground to function (rollers).

Known agricultural tractor rear hitches permit a drawbar to be removed from the rear hitch or adjusted wherein the rearward extension of the drawbar can be changed to cater for various tasks. Many rear hitch designs also cater for a variety of implement connector plates which are interchangeable to cater for various towed implements. For example, one implement connector plate may include a ball coupling whereas another may include a piton coupling.

As agricultural tractor technology advances so too does the maximum speed at which tractors are permitted to travel on highways. This carries the burden of various regulation requirements such as the need to upgrade braking systems on the vehicle.

In attempting to improve braking systems, it has proved desirable to vary the braking force depending upon load. In particular, a braking force of a tractor and trailer combination can be spread across the axles of the tractor and trailer depending upon the load on the trailer. For example, a vehicle towing a heavy load will apply a greater braking force to axles upon the towed vehicle thus saving wear on the brakes of the towing vehicle and reducing the risk of jack-knifing.

Various attempts have been made to provide means to measure the load placed by an implement on a drawbar. For example, International patent application number WO-91/02226 discloses a force measurement device for a trailer coupling which measures the vertical force component acting upon the coupling between a towing vehicle and a towed vehicle.

SUMMARY OF INVENTION

It is an object of the invention to provide a rear hitch assembly for an agricultural tractor which can measure the D load (that is the horizontal load placed upon the hitch when on flat ground) in a simple manner.

It is a further object of the invention to provide a rear hitch assembly with means to measure the D load placed upon the tractor for a variety of towed implements irrespective of the means of attachment.

In accordance with the invention there is provided a rear hitch assembly attached to an agricultural tractor, the assembly comprising a drawbar carrier element mounted to the underside of a chassis by a first connection which permits fore and aft movement of the carrier element relative to the chassis, and a second connection which includes a load sensor which senses horizontal load placed upon the carrier element, wherein implement connector elements are attached to the carrier in a fixed positional relationship.

The provision of a drawbar carrier element allows the sensing means to be associated entirely with the rear hitch thus allowing easy removal or adjustment of the drawbar. Furthermore, by mounting the drawbar carrier element in this way the vertical and horizontal load placed upon the drawbar are isolated from one another thereby allowing accurate measurement of the separate load components.

Horizontal load will be hereinafter referred to as "D load" and will correspond to load acting along a longitudinal (fore and aft) axis relative to the tractor. Vertical load will be hereinafter referred to as "S load" which is the force acting downwardly perpendicular to said longitudinal axis.

Implement connector elements which may be attached to the carrier include drawbar hook-type hitches and implement connector plates. It should be understood that this list is non exhaustive and that other implement connector elements may be attached to the carrier without deviating from the scope of the invention. The term 'implement connector element' includes any device to which a tractor-mountable implement can be attached.

Advantageously, the provision of a drawbar carrier allows the load on the drawbar to be measured with standard load-sensing components already used in three-point linkage systems.

The first connection is preferably disposed rearward of the second connection and preferably includes a sliding contact between the carrier and a bearing fixed relative to the chassis to allow fore and aft movement of the carrier relative to the chassis. In a preferred example the first connection bears the majority of the S-load placed upon the carrier.

The first connection preferably includes a shaft, or pair of shafts, held in position relative to the chassis wherein the shafts are aligned longitudinally and are in sliding contact with the carrier element thereby permitting the aforementioned fore and aft movement. Other means of mounting the carrier to the chassis are envisaged but in all cases the degree of freedom of the carrier along the longitudinal axis is free (within limits).

The second connection preferably comprises a load sensing element mounted to the underside of the chassis and disposed through a bore in the carrier element. The load sensing element (or force measurement device) may take the form of a simple pin formed of suitable material having characteristics which vary dependant upon the load place thereon.

The carrier element preferably comprises support means for supporting a removable drawbar, the support means comprising a forward and rear support element secured to the carrier element. In a preferred arrangement each support element together with the carrier element presents a channel into which the drawbar can be slotted. The support elements are preferably mounted to the underside of the carrier element thereby bearing the S-load placed upon the drawbar.

Advantageously, by providing the load sensing apparatus between the carrier element and the chassis, various implement connector elements can be attached without any direct connection to the sensing apparatus. In addition to, or instead of, the drawbar a variety of interchangeable implement connector plates may be attached to the carrier. Therefore, any load placed upon the implement connector plate is measurable by the load sensor. Such an arrangement is extremely flexible in design and allows a single load sensor to be employed for a variety of towed implements irrespective of the means of attachment.

BRIEF DESCRIPTION OF THE DRAWINGS

Further advantages of the invention will become apparent from the following description of a specific embodiment with reference to the appended drawings in which.

DESCRIPTION OF EXAMPLE EMBODIMENT

Figure 1:
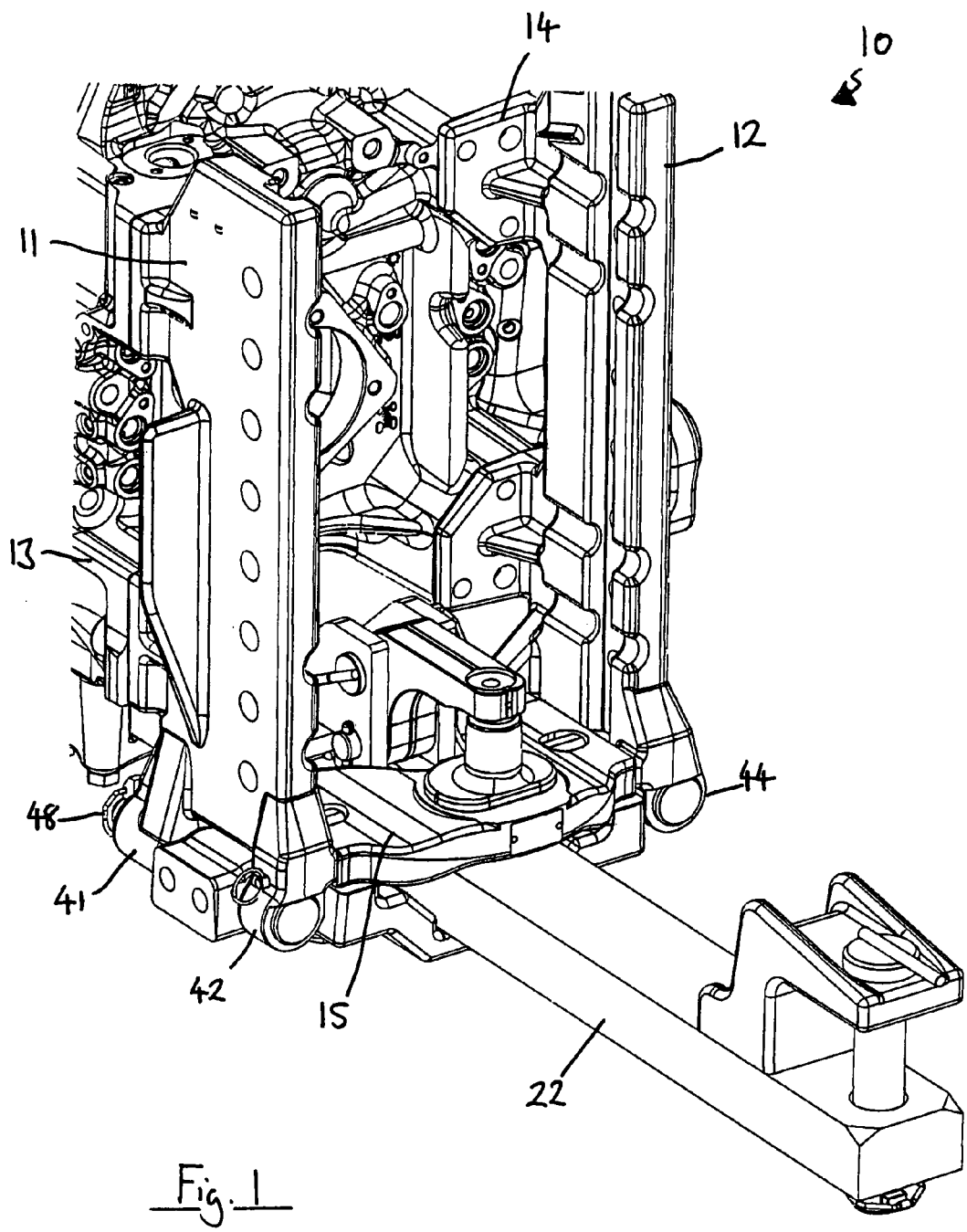
FIG. 1 is a rear perspective view of a rear hitch assembly in accordance with the invention.
Figure 3:
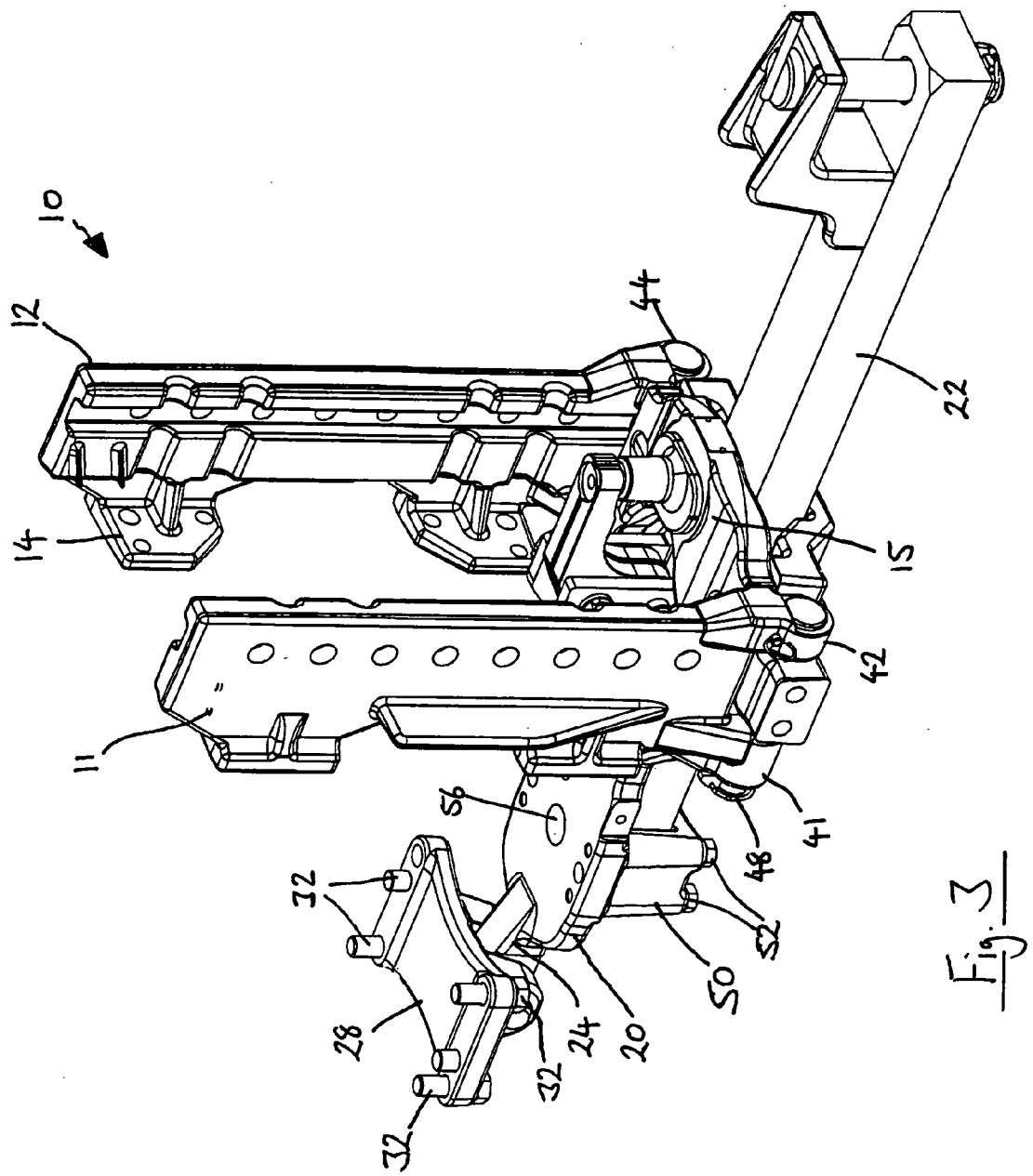
FIG. 3 is a rear perspective view of the rear hitch of FIG. 1 shown without the tractor chassis.
Figure 4:
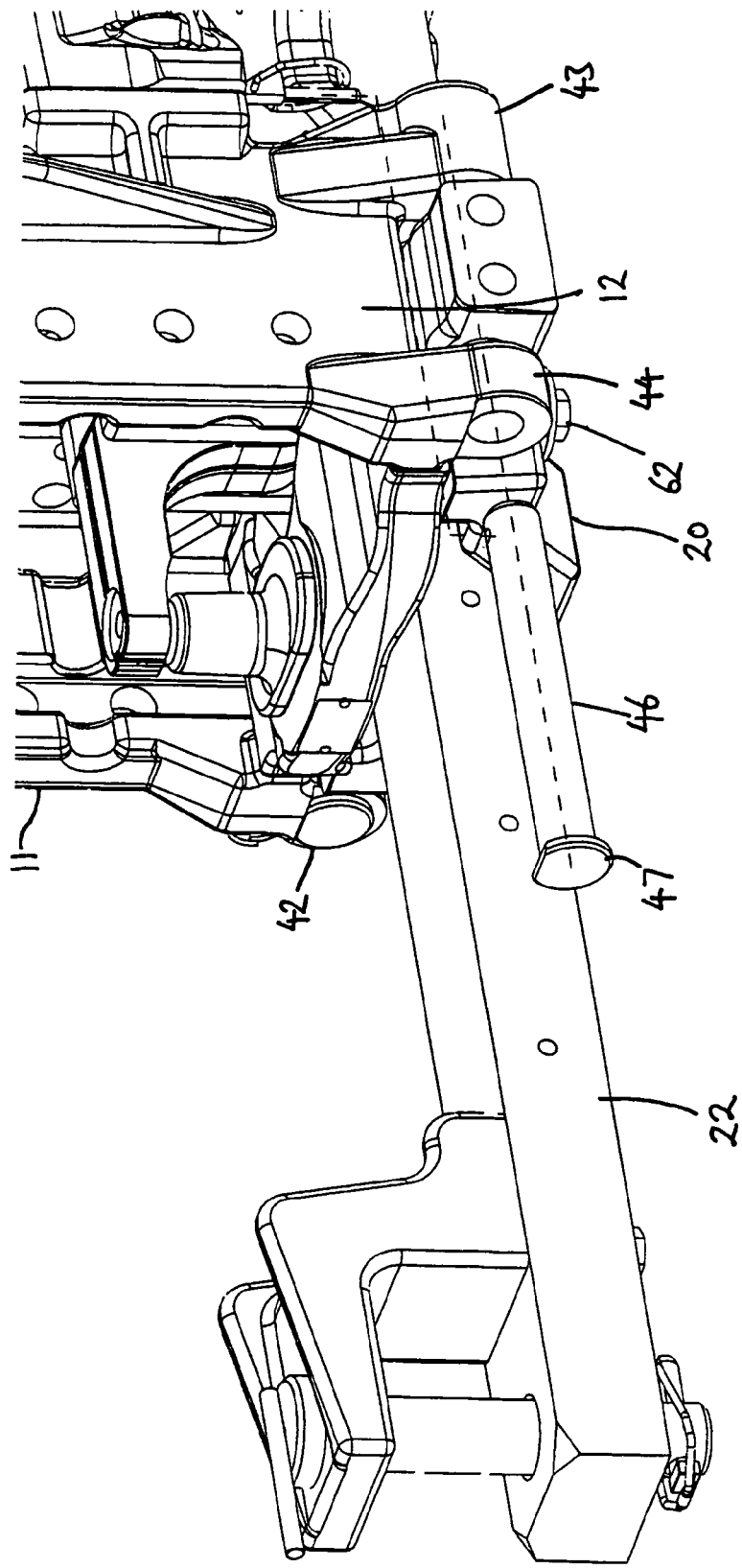
FIG. 4 is a perspective view of part of the rear hitch of FIG. 1 showing the sliding connection means in exploded form.
Figure 6:
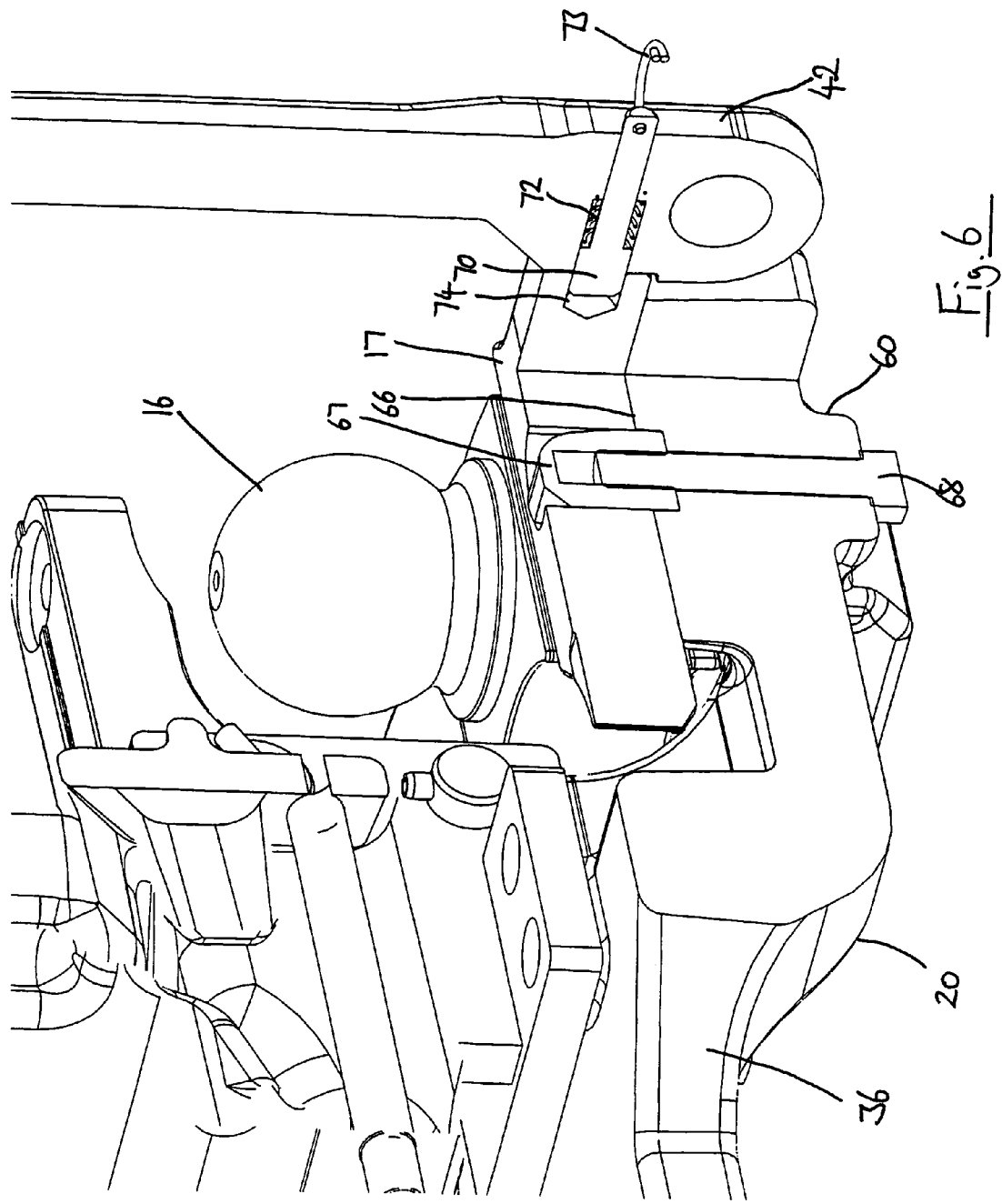
FIG. 6 shows a perspective view of a cutaway section of the rear hitch of FIG. 1 illustrating the means connecting an implement connector plate to the carrier.
Figure 7:
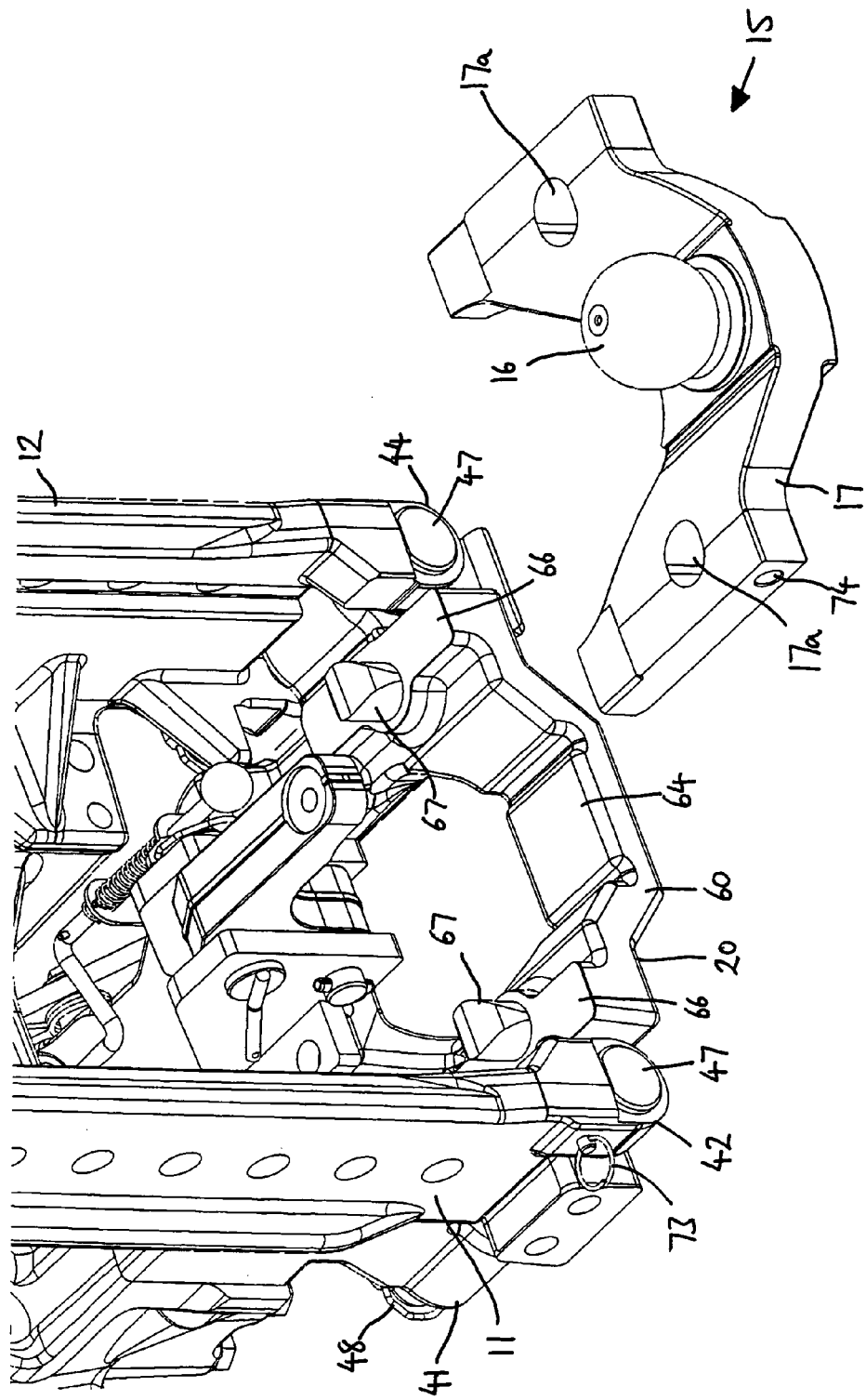
FIG. 7 shows a rear perspective view of part of the rear hitch of FIG. 1 showing an implement connector plate in a removed position.

With reference to the drawings the tractor rear hitch 10 comprises a pair of vertically extending spaced rails 11 and 12 which are secured to the rear of tractor axle housing 13 by bolts (not shown) extending through flanges 14. Supported between the rails 11 and 12 is an implement connector 15 which comprises a coupling pin 16 mounted on a plate 17 which is held in a generally horizontal position between the rails. FIGS. 1, 3 and 4 show the implement connector plate with a piton coupling having a raised cylindrical pin. FIGS. 6 and 7 on the other hand show the implement connector plate 15 as comprising a ball coupling having substantially cylindrical body. The implement connector plates 15 are interchangeable with one another and various other designs known in the art are available to cater for different coupling types.

The rear hitch assembly 10 further comprises a drawbar carrier element 20 which is secured to the underside of axle housing 13 and serves to secure and support a drawbar 22 of known construction. The drawbar carrier element 20 is mounted to the underside of axle housing 13 in a way which gives the carrier element 20 a degree of freedom along a longitudinal, fore and aft, axis relative to the tractor's normal direction of travel.

Figure 2:
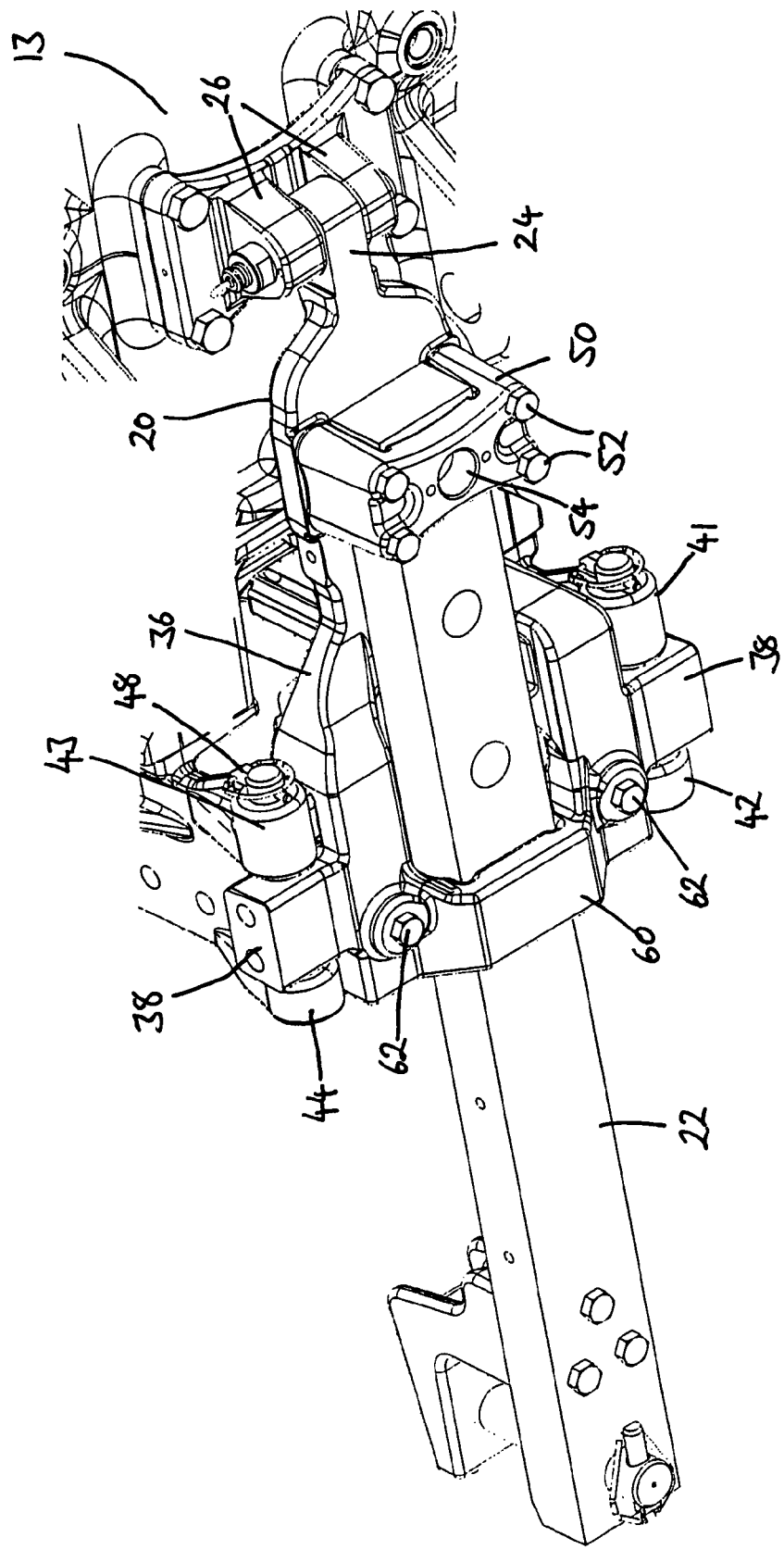
FIG. 2 is a perspective view of the underside of the rear hitch of FIG. 1.
Figure 5:
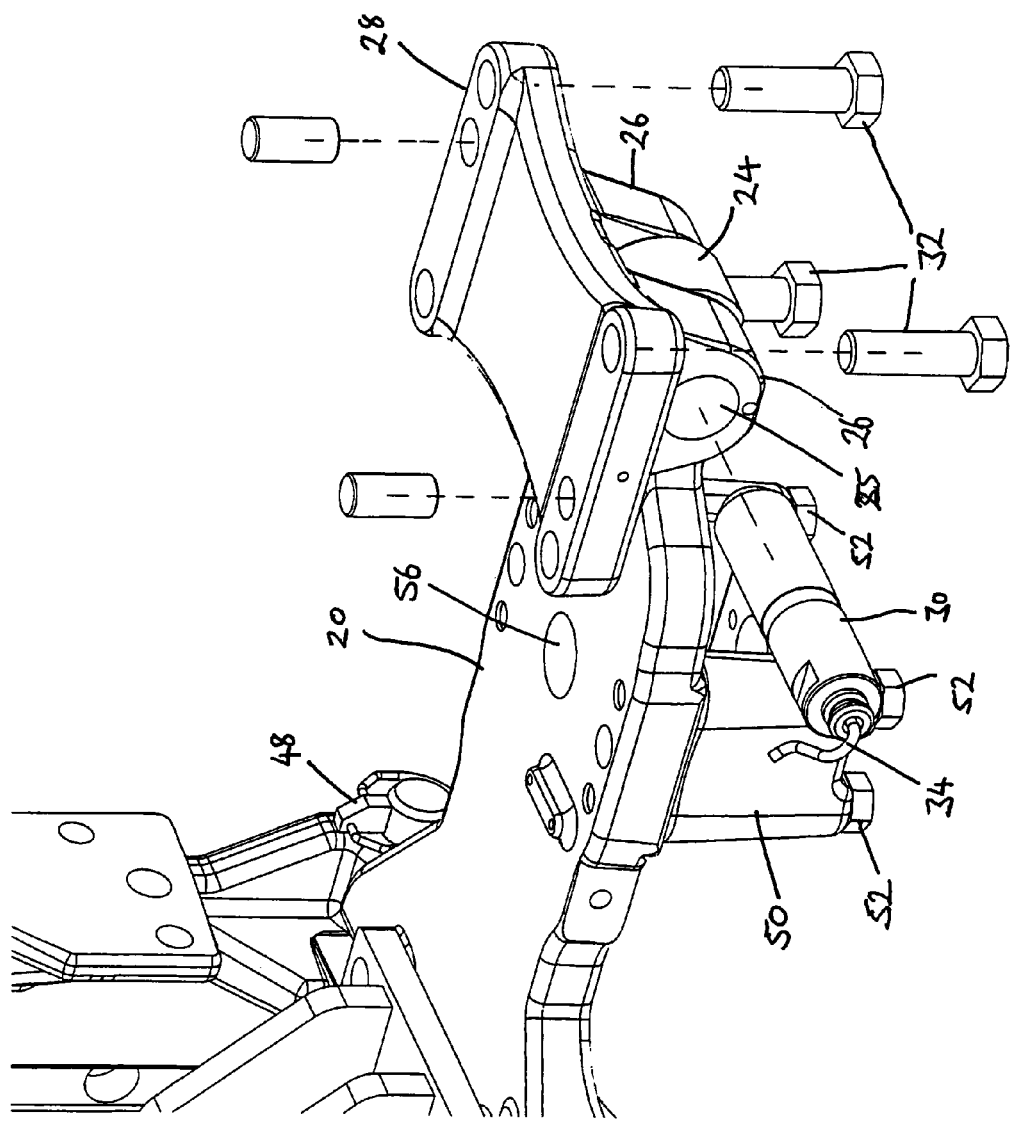
FIG. 5 is a front side perspective view of the rear hitch of FIG. 1 showing the front connection means in exploded form.

With particular reference to FIGS. 2, 3 and 5, the drawbar carrier 20 includes a forwardly extending neck 24 which comprises a transverse hole which aligns with holes 25 formed in a pair of parallel lugs 26 which are secured to a mounting plate 28. A load sensing pin 30 is inserted through holes 25 provided in lugs 26 and neck 24. Mounting plate 28 is secured to the underside of axle housing 13 by bolts 32. Load sensing pin 30 is of a known construction and permits a degree of deformation (or bending) in response to an applied shear load. Wires 34 connect the load sensing pin 30 to an electronic control unit (not shown) on the tractor to process the sensing signals.

Towards the rear, the carrier element 20 widens in the transverse direction at shoulders 36. The rear, wider, portion of carrier element 20 includes a pair of transversely extending stubs 38 which each include a longitudinally-aligned bore (not shown) which aligns between a respective first pair of lugs 41,42 attached to the bottom end of rail 11 and a second pair of lugs 43, 44 attached to the bottom end of rail 12. Each lug 41, 42, 43, 44 includes a longitudinally-aligned bore aligned with the associated bore in stubs 38. A respective pin 46 engages these holes to provide vertical support for stubs 38 and thus drawbar carrier 20. Each pin 46 is inserted from the rear of the hitch and includes a head 47 which prevents the pin from passing completely through the holes of rear lugs 42, 44. Each pin is held in position by a lynch pin 48 or other suitable securing means.

The support of drawbar carrier element 20 provided by pins 46 allows freedom of movement in the longitudinal direction relative to the axle housing 13. This movement is of course limited by the spacing between stubs 38 and adjacent lugs 41, 42, 43, 44.

Drawbar 22 is supported by carrier element 20 by means of a pair of support elements. A forward support element 50 (FIGS. 2 and 5) is secured to the underside of carrier element 20 by bolts 52 and provides a front guide or cradle for the end of the drawbar 22 remote the implement. The bottom plate of forward support element 50 has a hole 54 formed therein which is vertically aligned with a hole 56 formed in the carrier element 20. When engaged in the cradle 50 the drawbar 22 is secured to the carrier element 20 by a pin (not shown) which is inserted through holes 56 and 54 and a corresponding hole in drawbar 22. This ensures that the drawbar 22 is fixed relative to the carrier element 20.

A rear drawbar support element 60 is secured to the underside of carrier element 20 by bolts 62. Rear support element 60 is secured at the rear wider end of the carrier element 20 and bridges the width thereof with a cradle section 64 which is lower than the transverse edges and serves to provide a guide and support for drawbar 22.

Rear support element 60 further comprises at its transverse outer edges upwardly facing support surfaces 66 which support and bear the weight of a selection of interchangeable implement connector plates 15. Each upwardly facing surface 66 includes an upstanding peg 67 secured thereto by bolt 68 which is best seen in FIG. 6. Each peg 67 engages a respective hole 17a formed in each implement connector 15. To prevent lifting of the implement connector plate 15 when in position a transversely extending horizontal peg 70 is provided on at least one side through a bore formed in lugs 42, 44. Each horizontal peg 70 is biased into an engaged position by spring 72 and is withdrawn to allow engagement of implement connector plate 15 by pulling on an attached ring 73.

Therefore implement connector plates can be attached by lowering into position at an angle to engage pegs 67 in hole 17a and pulling ring 73 to withdraw peg 70 thus allowing lowering into position. The detent 74 which is formed in implement connector plate 15 is of a large enough size to allow a small degree of longitudinal movement of connector plate 15 relative to peg 72 which is fixed relative to the axle housing 13.

All vertical loads placed upon the drawbar 22 or implement connector 15 is borne by pins 46. The D-load (or horizontal load) placed upon the drawbar or implement connector 15 is transferred entirely to load sensing pin 30 due to the longitudinal degree of freedom given to drawbar carrier element 20. Advantageously, the D-load can be measured in isolation by load sensing pin 30 and is independent of any inclines upon which the tractor and implement are standing.

The provision of the multi-functional carrier element 20 allows a multitude of different implement connector elements to be secured thereto allowing accurate measurement of the D-load regardless of the type of coupling employed.

It should also be understood that towed implements may be attached to implement connector 15 whilst the drawbar 22 is absent while still measuring the D-load.

In summary there is provided a rear hitch assembly for an agricultural tractor. The assembly comprises a drawbar carrier element mounted to the underside of a chassis by a first connection which permits fore and aft movement of the carrier element relative to the chassis. A second connection includes a load sensor which senses horizontal load placed upon the carrier element. Implement connector elements such as drawbars and connector plates are attached to the carrier in a fixed positional relationship. The horizontal load is isolated from the vertical load and measured by the load sensor to provide load information which can be utilised by brake systems for example.

The invention claimed is:

1. A rear hitch assembly attached to an agricultural tractor, the assembly comprising a drawbar carrier element mounted to the underside of a chassis by a first connection which permits fore and aft movement of the drawbar carrier element relative to the chassis, and a second connection which includes a load sensor which senses horizontal loads placed upon the drawbar carrier element, wherein implement connector elements are attached to the drawbar carrier element in a fixed positional relationship.

2. An assembly according to claim 1, wherein the first connection comprises a sliding contact between the drawbar carrier element and a longitudinally-aligned pin fixed relative to the chassis.

3. An assembly according to claim 2, wherein the carrier element is supported by a pair of pins, each engaged on a respective side thereof, each pin being aligned longitudinally and being in sliding contact with a respective bore provided by the drawbar carrier element.

4. An assembly according to claim 1, wherein the second connection comprises a load sensing element mounted to the underside of the chassis and disposed through a bore in the drawbar carrier element.

5. An assembly according to claim 1, wherein the drawbar carrier element comprises a pair of support elements for supporting a drawbar, the pair of support elements comprising a forward support element and a rear support element secured to the drawbar carrier element.

6. An assembly according to claim 1, wherein the drawbar carrier element comprises means to secure thereto and support an implement connector plate.

\* \* \* \* \*